United States Patent
Sung

(10) Patent No.: US 7,990,019 B2
(45) Date of Patent: Aug. 2, 2011

(54) FLAT MOTOR HAVING A DUAL AIR GAP

(75) Inventor: Sam Kyung Sung, Busan (KR)

(73) Assignee: Sam Kyung Sung, Busan (KR)

( * ) Notice: Subject to any disclaimer, the term of this patent is extended or adjusted under 35 U.S.C. 154(b) by 113 days.

(21) Appl. No.: 12/252,115

(22) Filed: Oct. 15, 2008

(65) Prior Publication Data

US 2009/0195100 A1 Aug. 6, 2009

(30) Foreign Application Priority Data

Feb. 5, 2008 (KR) .................. 10-2008-0011451

(51) Int. Cl.
*H02K 1/22* (2006.01)
*H02K 1/27* (2006.01)
*H02K 37/00* (2006.01)
*H02K 37/10* (2006.01)

(52) U.S. Cl. ............... 310/266; 310/156.37; 310/49.42; 310/114; 310/156.36; 310/49.37

(58) Field of Classification Search .......... 310/268, 310/156.37, 156.36, 114, 266; H02K 1/27, H02K 1/22, 37/00, 37/10
See application file for complete search history.

(56) References Cited

U.S. PATENT DOCUMENTS

| 4,246,504 A * | 1/1981 | Clifford et al. ............ 310/181 |
|---|---|---|
| 4,255,682 A * | 3/1981 | Toida et al. ............ 310/168 |
| 4,551,645 A * | 11/1985 | Takahashi et al. ............ 310/46 |
| 4,792,709 A * | 12/1988 | Smith et al. ............ 310/49.33 |
| 6,005,320 A * | 12/1999 | Kim et al. ............ 310/156.36 |
| 6,118,202 A * | 9/2000 | Pinkerton ............ 310/178 |
| 6,940,200 B2 * | 9/2005 | Lopatinsky et al. ............ 310/178 |
| 7,127,034 B1 * | 10/2006 | Lee et al. ............ 378/131 |
| 2003/0102727 A1 * | 6/2003 | Sakamoto ............ 310/49 R |
| 2008/0024028 A1 * | 1/2008 | Islam et al. ............ 310/187 |
| 2008/0088200 A1 * | 4/2008 | Ritchey ............ 310/268 |

FOREIGN PATENT DOCUMENTS

| KR | 10-0269035 B1 | 7/2000 |
|---|---|---|
| KR | 10-0417637 B1 | 1/2004 |

OTHER PUBLICATIONS

Machine translation of of Seong Reference (10-0417637).*

* cited by examiner

*Primary Examiner* — Quyen Leung
*Assistant Examiner* — Terrance Kenerly
(74) *Attorney, Agent, or Firm* — Birch, Stewart, Kolasch & Birch, LLP

(57) ABSTRACT

An electric motor is provided which includes a stator, in which field magnets are fixedly and radially installed on a circular panel-shaped base. A coaxial cylindrical rotor is coupled to a shaft and is configured to allow the stator to be located at an inside thereof, the rotor being configured such that magnets, having different polarities to form each pair, are attached on an outer cylinder and an inner cylinder of the rotor and are arranged opposite each other. A rotary magnet plate is coupled to the shaft on a top of the cover, and is provided with a number of magnets corresponding to a number of pairs of the rotor magnets. The respective pairs of rotor magnets are arranged on the outer and inner cylinders while being spaced apart from each other by a predetermined interval.

2 Claims, 8 Drawing Sheets

CONVENTIONAL ART

CONVENTIONAL ART

FLAT MOTOR HAVING A DUAL AIR GAP

BACKGROUND OF THE INVENTION

1. Field of the Invention

The present invention relates to an electric motor, which obtains maximum rotary power and force from low electric power, thus greatly improving energy efficiency.

The present invention relates to an electric motor, comprising a stator, in which field magnets are fixedly and radially installed on a circular panel-shaped base, a coaxial cylindrical rotor coupled to a shaft, which penetrates through a center of the base, and configured to allow the stator to be located at an inside thereof, the rotor being configured such that magnets, having different polarities to form each pair, are attached on an outer cylinder and an inner cylinder of the rotor and are arranged opposite each other, a cover coupled to the circular panel-shaped base to cover the rotor while causing the shaft of the rotor to penetrate through and protrude from the cover, a rotary magnet plate coupled to the shaft on a top of the cover, and provided with a number of magnets corresponding to a number of pairs of the rotor magnets, magnetic sensors formed on the top of the cover and configured to come into contact with the rotary magnet plate, and a current control device configured to control a magnetization direction of the field magnets of the stator using a rotation angle signal detected by the magnetic sensors, wherein the rotor magnets attached on the outer cylinder and the inner cylinder of the rotor have different polarities to form each pair and are arranged opposite each other, and respective pairs of rotor magnets are arranged on the outer and inner cylinders while being spaced apart from each other by a predetermined interval.

2. Description of the Related Art

The present invention relates to an electric motor, which is an improvement of Korean Patent No. 10-0417637.

Korean Patent No. 10-0417637 relates to an electric motor, which controls the current flowing through a field winding and the polarity variation time in proportion to the speed of rotation of the motor, so that rotary power is increased by causing both an attractive force and a repulsive force to be at work when a field core and the center of rotor magnets are closest to each other after the field core is completely magnetized, and in which a rotor with N and S-pole permanent magnets attached thereto is formed by integrating two magnets having different diameters into a single body, but the field core is arranged between the two rotor magnets, so that an attractive force and a repulsive force bidirectionally act between a magnetized field core and the two rotor magnets in a dual mode, thus obtaining maximum rotary power from low electric power.

Generally, a motor is a rotating device for converting electrical energy into mechanical energy. A DC motor driven by DC power typically includes a stator composed of permanent magnets and fixedly installed on the outer side of a main body, a rotor rotated by an attractive force and a repulsive force relative to the stator, and a brush coming into contact with the rotor to supply current to the coils, wherein the rotor includes a core fixedly installed on a shaft and configured to rotate, the coils wound around the core and configured to allow the core to have an electromagnetic property because of supplied current, and a commutator configured to supply current to the coil.

In such a conventional DC motor, the core, which is fixedly installed on the shaft and is composed of a plurality of folders, coils wound around the folders, and the commutator for supplying current to the coils, are connected to constitute the rotator, so that the construction of the rotator is complicated, and a large load is imposed at the time of rotation, thus decreasing rotary power.

Further, in the conventional DC motor, since half of the folders formed on the core are fixedly maintained as N poles and the remaining half are fixedly maintained as S poles, an attractive force and a repulsive force act only on the ends of the permanent magnets of the stator and on some of the folders of the rotator placed at the ends, and thus uniform rotary power is maintained. However, in order to obtain higher rotary power, a lot of current must be supplied to the coils through the commutator, thus resulting in a problem in which power consumption increases.

In particular, recently, electric vehicles have been rapidly developed, and a DC electric motor in such an electric vehicle is an essential power generation means, so that the development of DC electric motors capable of obtaining high rotary power and force from low electric power is urgently required.

For this purpose, the present applicant proposed technology disclosed in Korean Patent Nos. 0269035 and 0417637, and intends to enhance the energy efficiency of a motor by further improving on the above patents.

SUMMARY OF THE INVENTION

Accordingly, the present invention has been made keeping in mind the above problems occurring in the prior art, and an object of the present invention is to provide an electric motor, which improves the energy efficiency of electric motors disclosed in Korean Patent No. 0269035 and 0417637 of the present applicant.

In order to accomplish the above object, the present invention provides an electric motor, comprising a stator, in which field magnets are fixedly and radially installed on a circular panel-shaped base; a coaxial cylindrical rotor coupled to a shaft, which penetrates through a center of the base, and configured to allow the stator to be located at an inside thereof, the rotor being configured such that magnets, having different polarities to form each pair, are attached on an outer cylinder and an inner cylinder of the rotor and are arranged opposite each other; a cover coupled to the circular panel-shaped base to cover the rotor while causing the shaft of the rotor to penetrate through and protrude from the cover; a rotary magnet plate coupled to the shaft on a top of the cover, and provided with a number of magnets corresponding to a number of pairs of the rotor magnets; magnetic sensors formed on the top of the cover and configured to come into contact with the rotary magnet plate; and a current control device configured to control a magnetization direction of the field magnets of the stator using a rotation angle signal detected by the magnetic sensors, wherein the rotor magnets attached on the outer cylinder and the inner cylinder of the rotor have different polarities to form each pair and are arranged opposite each other, and respective pairs of rotor magnets are arranged on the outer and inner cylinders while being spaced apart from each other by a predetermined interval.

Preferably, the rotor may be configured such that the rotor magnets arranged on the outer and inner cylinders form ten pairs, and the stator may be configured such that eight field magnets are formed between the outer and inner cylinders of the rotor.

Preferably, the rotor may be configured such that the rotor magnets arranged on the outer and inner cylinders form 20 pairs, and the stator may be configured such that 12 field magnets are formed between the outer and inner cylinders of the rotor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings. Further, detailed descriptions may be omitted if it is determined that the detailed descriptions of related well-known functions or constructions may make the gist of the present invention unclear.

Further, the following terms are defined in consideration of the functionality of the present invention, and may vary according to the intention of a user or an operator, usage, etc. Therefore, the definitions should be made on the basis of the overall content of the present specification.

Figure 1:
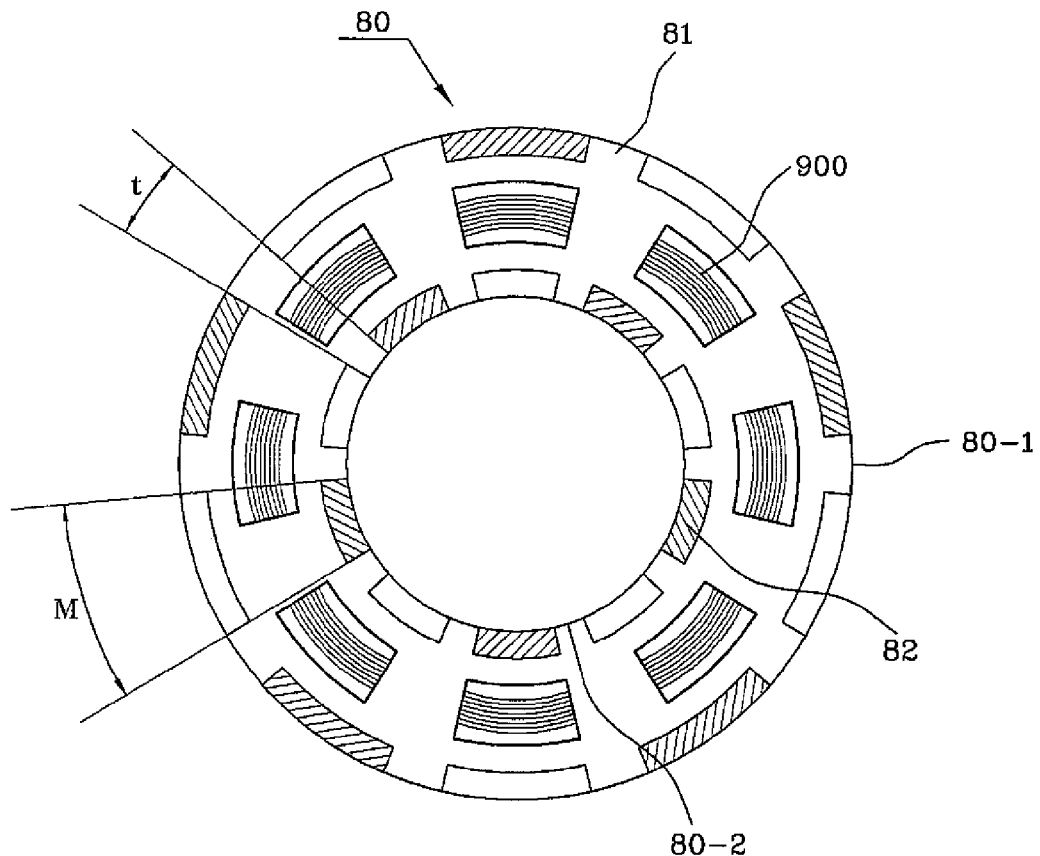
FIG. 1 is a sectional view showing an electric motor according to the present invention.
Figure 2:
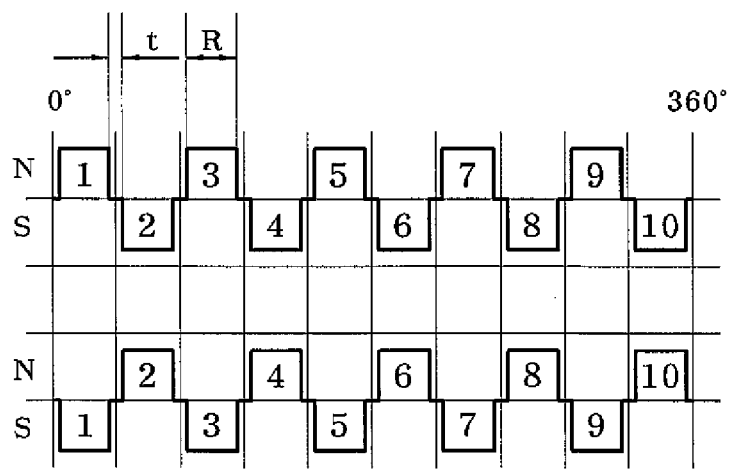
FIG. 2 is a view showing the arrangement of the polarities of rotor magnets according to the present invention.
Figure 3:
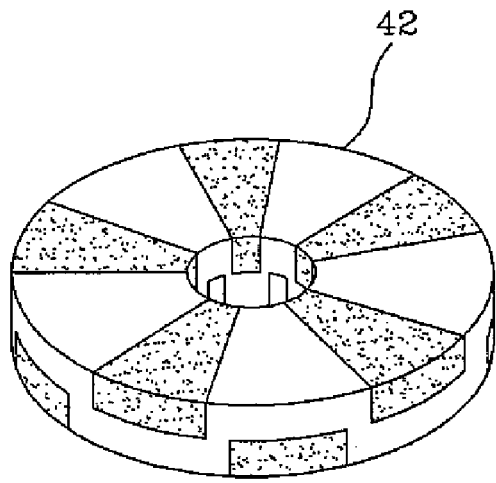
FIG. 3 is a perspective view showing a rotary magnet plate used in the electric motor of FIG. 1 according to the present invention.
Figure 4:
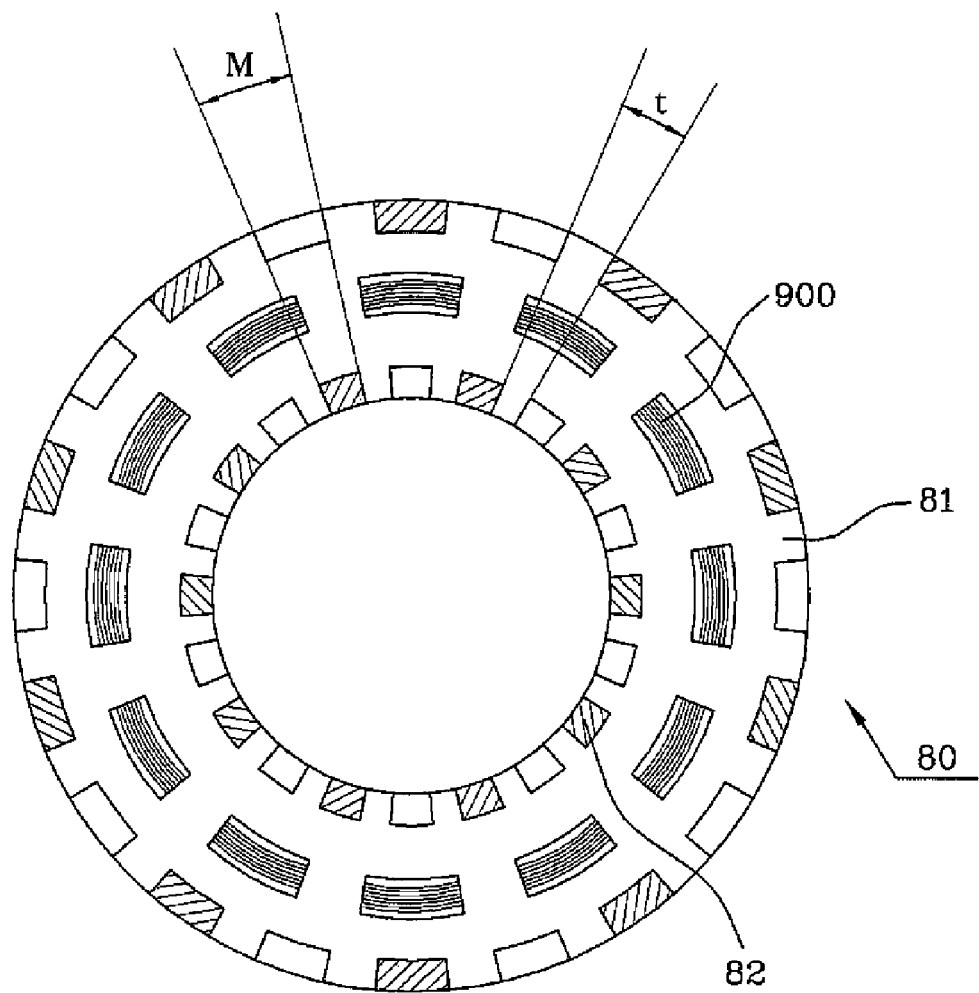
FIG. 4 is a sectional view showing an electric motor according to another embodiment of the present invention.
Figure 5:
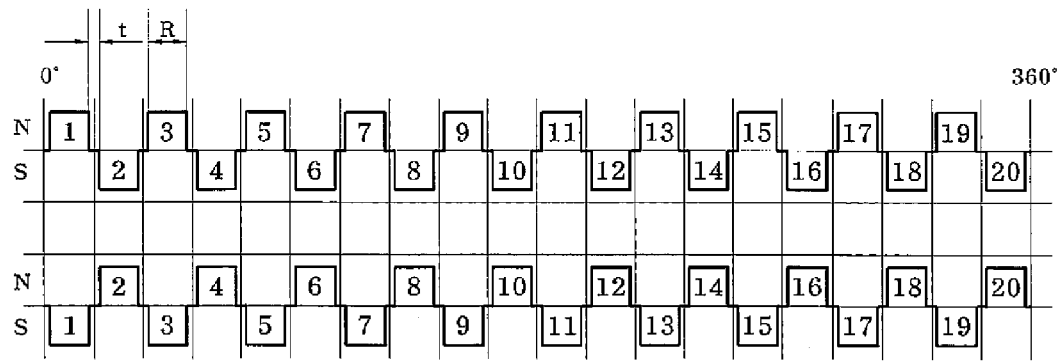
FIG. 5 is a view showing the arrangement of the polarities of the rotor magnets of FIG. 4.
Figure 6:
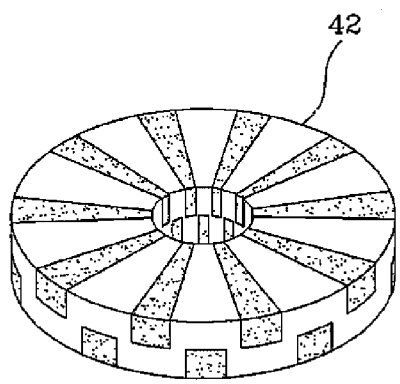
FIG. 6 is a perspective view showing a rotary magnet plate used in the electric motor of FIG. 4 according to the present invention.
Figure 7:
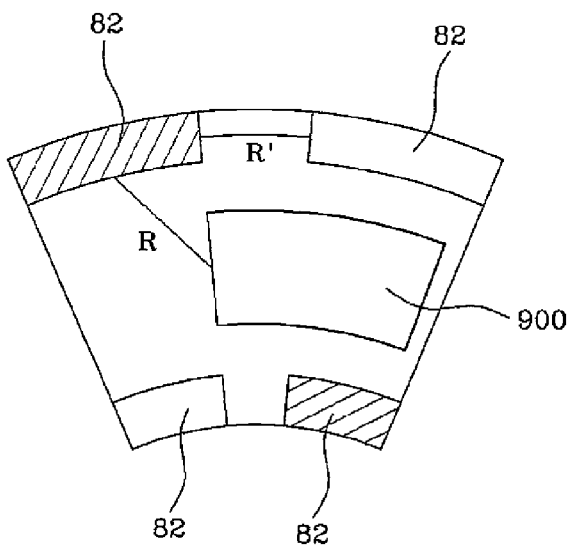
FIG. 7 is a view showing the flow of reluctance between rotor magnets and field cores according to the present invention.
Figure 8:
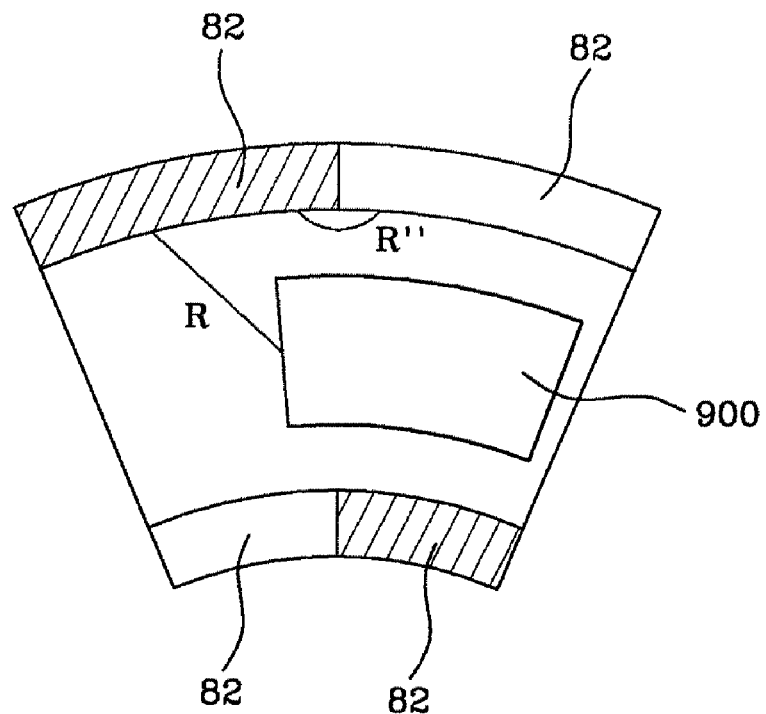
FIG. 8 is a view showing the flow of reluctance between rotor magnets and field cores in the prior art.
Figure 9:
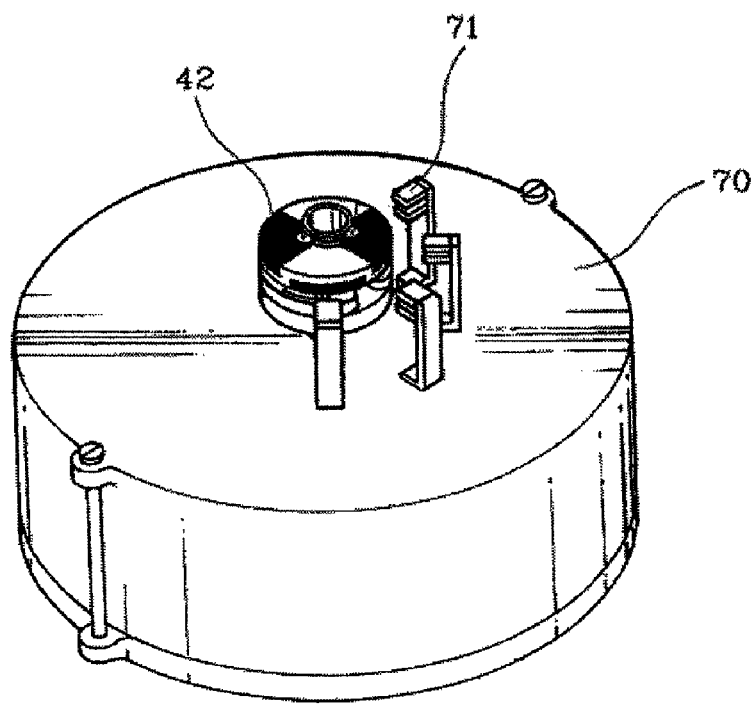
FIG. 9 is a perspective view showing a conventional electric motor, which is disclosed in Korean Patent No. 10-0417637 of the present applicant.
Figure 10:
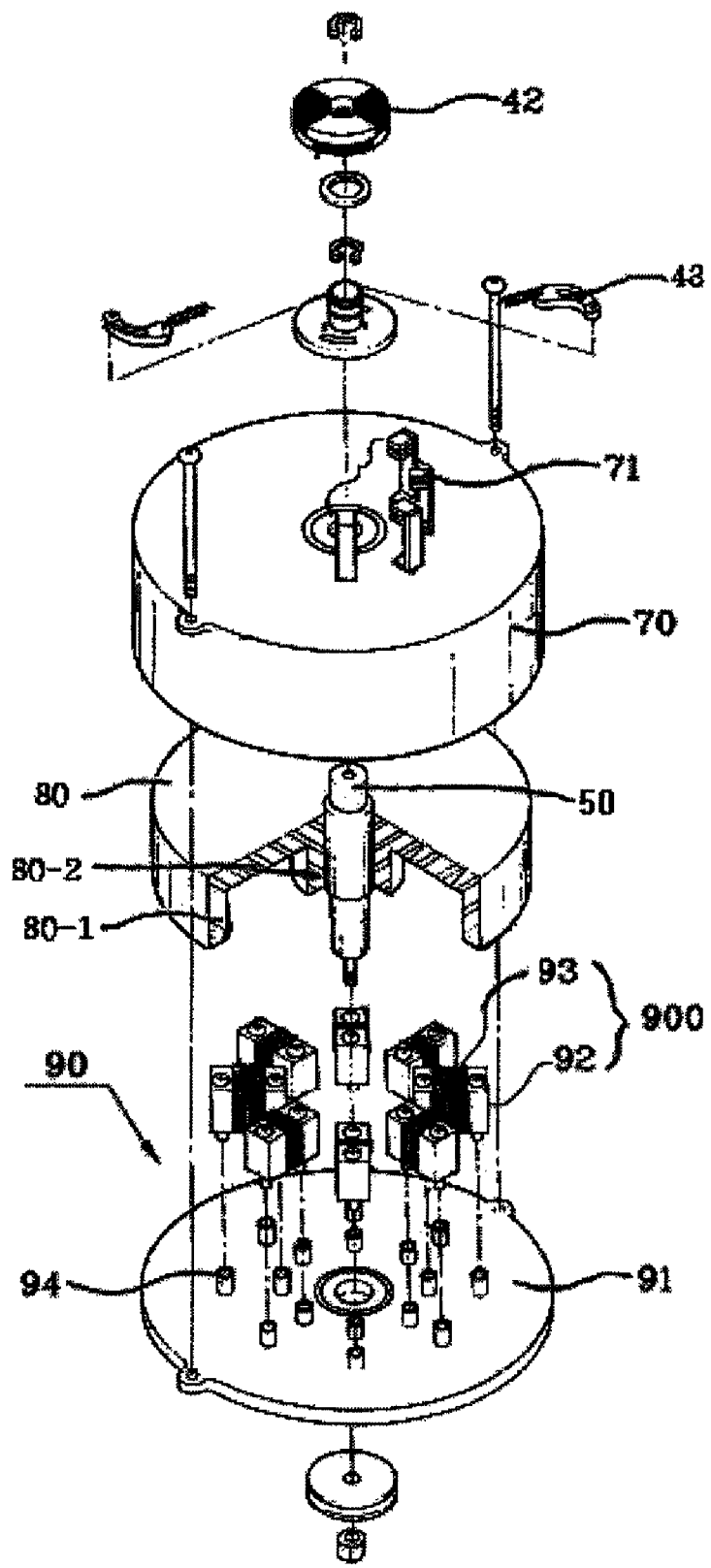
FIG. 10 is a view showing the assembly of the conventional electric motor of FIG. 9.
Figure 11:
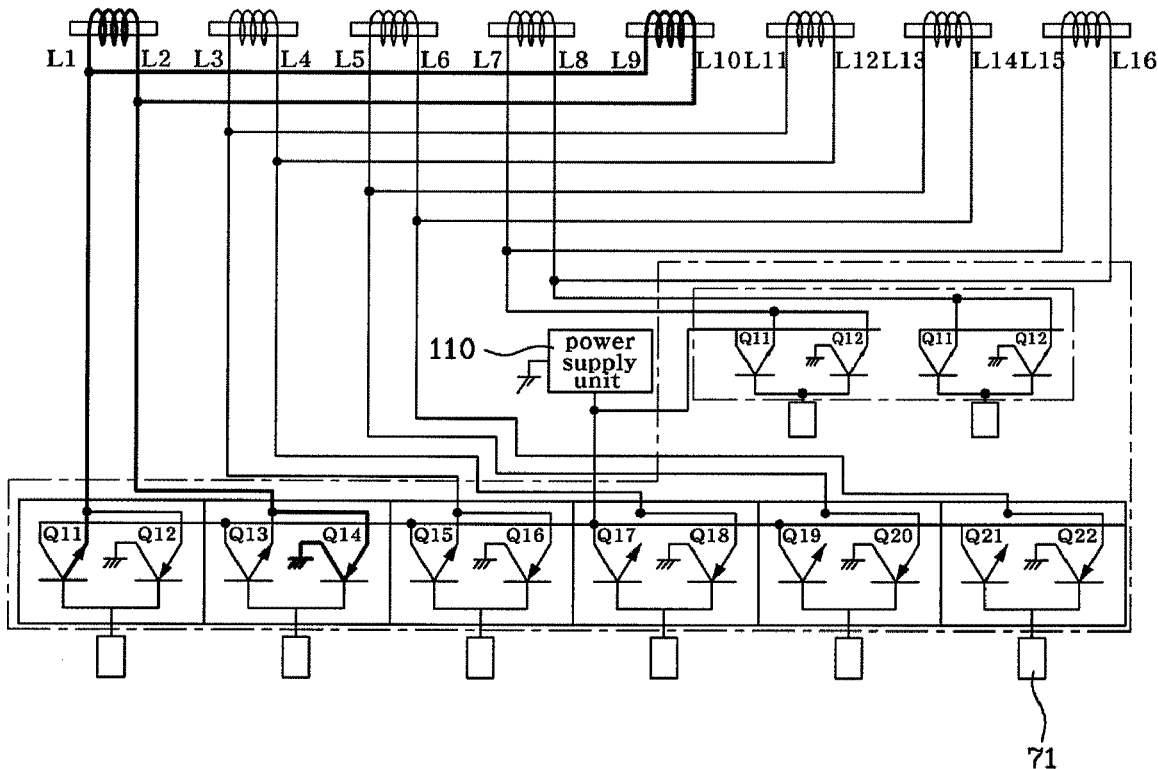
FIG. 11 is a circuit diagram showing the current control device of the conventional electric motor of FIG. 9.
Figure 12A:
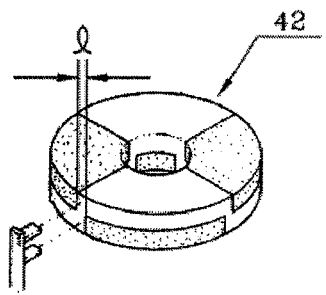
FIGS. 12A to 12E are views showing the rotary magnet plate of the conventional electric motor and the implementation thereof.
Figure 12B:
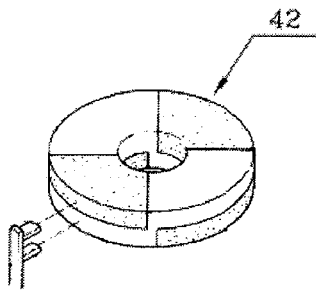
Figure 12C:
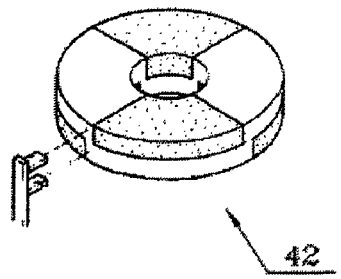
Figure 12D:
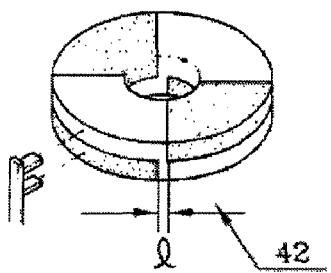
Figure 12E:
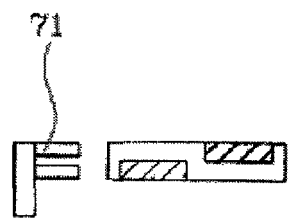
Figure 12E:
Figure 12E:
Figure 12E:
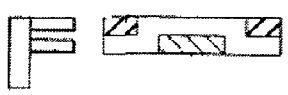
Figure 13:
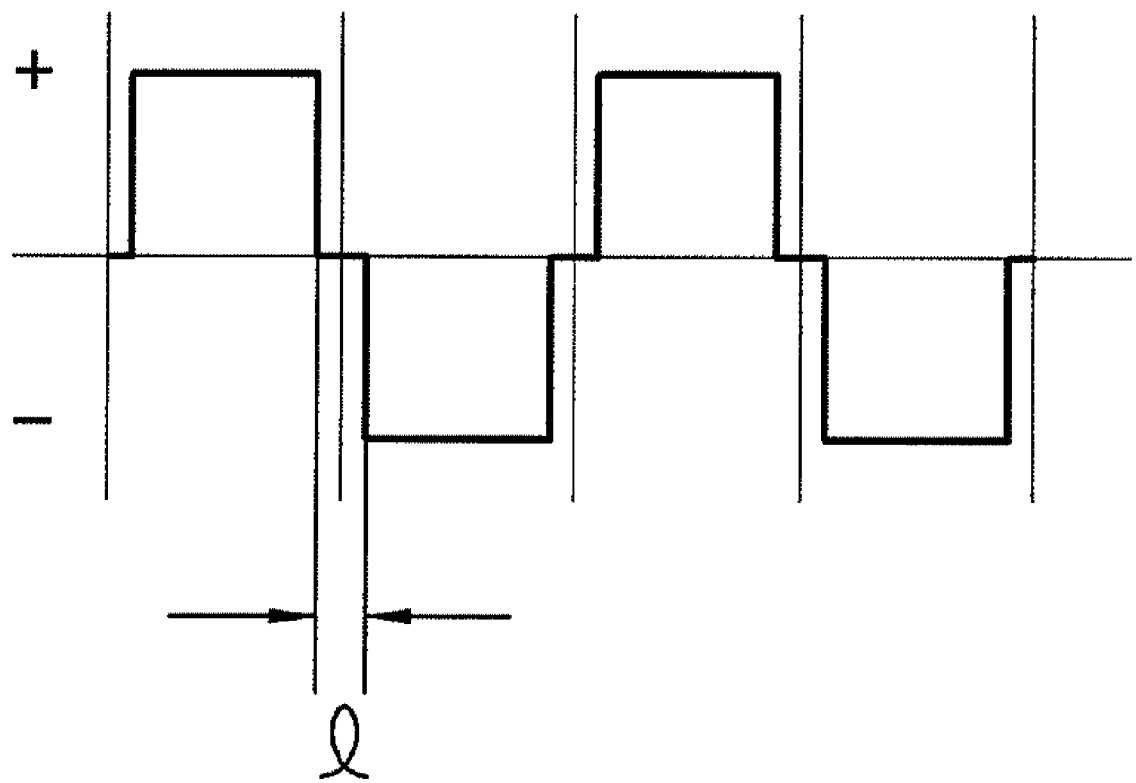
FIG. 13 is a graph showing current flowing into field windings in the conventional electric motor of FIG. 9.

FIG. 1 is a sectional view showing an electric motor according to the present invention, FIG. 2 is a view showing the arrangement of the polarities of rotor magnets according to the present invention, FIG. 3 is a perspective view showing a rotary magnet plate used in the electric motor of FIG. 1 according to the present invention, FIG. 4 is a sectional view showing an electric motor according to another embodiment of the present invention, FIG. 5 is a view showing the arrangement of the polarities of the rotor magnets of FIG. 4, FIG. 6 is a perspective view showing a rotary magnet plate used in the electric motor of FIG. 4 according to the present invention, FIG. 7 is a view showing the flow of reluctance between rotor magnets and field cores according to the present invention, FIG. 8 is a view showing the flow of reluctance between rotor magnets and field cores in the prior art, FIG. 9 is a perspective view showing a conventional electric motor, which is disclosed in Korean Patent No. 10-0417637 of the present applicant, FIG. 10 is a view showing the assembly of the conventional electric motor of FIG. 9, FIG. 11 is a circuit diagram showing the current control device of the conventional electric motor of FIG. 9, FIGS. 12A to 12E are views showing the rotary magnet plate of the conventional electric motor and the implementation thereof, and FIG. 13 is a graph showing current flowing into field windings in the conventional electric motor of FIG. 9.

As shown in the drawings, the present invention relates to an electric motor, which is an improvement of Korean Patent No. 10-0417637 (Korean Patent Appln. No. 10-2001-0077587).

Hereinafter, the structure of the electric motor disclosed in Korean patent No. 10-0417637 will be described in detail with reference to the drawings thereof so as to describe the present invention.

Korean patent No. 10-0417637 relates to an electric motor, which includes a circular panel-shaped base 91, field magnets 900, a stator 90, a shaft 50, a rotor 80, a cover 70, a rotary magnet plate 42, magnetic sensors 71, and a current control device, as shown in FIGS. 9 and 10.

The stator 90 is configured such that the field magnets 900 are fixedly and radially installed on the circular panel-shaped base 91.

As shown in FIG. 10, on the circular panel-shaped base 91 of the stator 90, a plurality of protrusions 94 for coupling the field magnets 900 to the base 91 is formed, and field cores 92, around which field windings 93 are wound, are fitted over the protrusions 94, and thus the field magnets 900 of the stator 90 are formed.

The rotor 80 is a coaxial cylindrical rotor coupled to the shaft 50, which penetrates through the center of the circular panel-shaped base 91, and is configured to allow the stator 90 to be located at the center thereof. Rotor magnets 80, having different polarities to form each pair, are attached on the outer cylinder 80-1 and the inner cylinder 80-2 of the coaxial cylindrical rotor, and are arranged opposite each other, as shown in FIG. 1.

The rotor 80 is covered with the cover 70, and the shaft 50 of the rotor 80 penetrates through the cover 70 and protrudes from the top of the cover 70.

On the shaft 50 of the rotor 80 protruding from the top of the cover 70, the rotary magnet plate 42 is installed. In the rotary magnet plate 42, a plurality of magnets corresponding to the number of pairs of rotor magnets are provided such that the magnets are inserted in the rotary magnet plate 42.

The magnetic sensors 71 are formed on the top of the cover 70 and are configured to come into contact with the rotary magnet plate 42 and to sense a rotation angle signal.

The current control device is a circuit part for controlling the magnetization direction of the field magnets of the stator 90, and controls the current direction of the field windings using the rotation angle signal sensed by the magnetic sensors 71.

FIGS. 12A to 12E are perspective views of the rotary magnet plate 42. As shown in the drawing, the rotary magnet plate 42 has a shape in which an upper plate, on which magnets are radially attached, and a lower plate, on which magnets are radially attached, are coupled to each other such that the polarities of the magnets on the upper and lower plates alternate with each other. As shown in FIG. 12, portions 1 on which magnets are not attached exist between respective magnets.

The magnetic sensors 71 are formed on the outer circumference of the rotary magnet plate 42 to sense the rotation of the rotary magnet plate 42. As shown in FIG. 10, a slacking device 43 for varying the angle of installation thereof in response to the rotation speed of the rotor 80 is installed.

When current flowing through the field windings 93 is controlled, or when the polarity of the current is varied using the current control device, the electric motor according to the present invention is operated such that an attractive force and a repulsive force are generated due to the magnetic force between the rotor magnets 82 and the field cores 92, and thus the rotor 80 rotates, and the rotary magnet plate 42, installed on the shaft, also rotates in conjunction with the rotor 80.

Hereinafter, the current control device of the electric motor of FIG. 11 will be described below. FIG. 11 is a circuit diagram showing a circuit for varying the polarities of the field cores 92 by varying the direction of current flowing through the field windings 93 in response to a magnetic detection signal from the magnetic sensors 71.

The construction of the circuit is described in detail. The emitters of NPN transistor (for example, Q11) and PNP transistor (for example, Q12) are connected to each other, and the bases thereof are connected to the magnetic sensor 71. The collector of the transistor (Q11) is connected to a power supply unit 110, and the collector of the transistor (Q12) is grounded. Switching units, formed by arranging the transistors (for example, Q11 and Q12) as described above, are consecutively provided for respective magnetic sensors 71.

Further, the first ends (for example, L1 and L9) of the field windings 93, placed opposite each other in the rotor, are connected to the emitters of the transistors Q11 and Q12, and the second ends thereof (for example, L2 and L10) are connected to the emitters of transistors (for example, Q13 and Q14), which constitute a switching unit adjacent to the transistors Q11 and Q12. Accordingly, the field windings 93 are driven in response to the signal from the magnetic sensors 71.

Meanwhile, in the case of FIGS. 12A and 12C, both the upper and lower portions of a magnetic sensor 71 are placed on a portion 1 on which magnets are not attached, so that magnetic field is not detected, and thus a magnetic detection signal is not generated.

Further, in the case of FIG. 12B, the upper portion of the magnetic sensor 71 generates a magnetic detection signal, and the lower portion thereof does not generate a magnetic detection signal.

Therefore, as the rotary magnet plate rotates, current flowing into one field winding is formed in the shape of the pulse wave of FIG. 13.

The electric motor disclosed in Korean Patent No. 10-0417637 of the present applicant is constructed as described above, and the present invention is an improvement of the electric motor having the above construction. Hereinafter, the features of the present invention are described below.

The present invention is characterized in that, in the electric motor, rotor magnets 82, attached on the outer cylinder 80-1 and the inner cylinder 80-2 of a rotor 80, are formed in such a way that two magnets having different polarities are arranged opposite each other on the outer cylinder 80-1 and the inner cylinder 80-2 to form one pair of rotor magnets 82, but respective pairs of rotor magnets 82 are arranged at regular intervals within the rotor 80. In detail, the pairs of rotor magnets 82 are arranged on the outer and inner cylinders at regular intervals while being spaced apart from each other by a predetermined interval 81.

The rotor magnets of the present invention having the above construction can be shown, as in the case of FIG. 1.

As shown in FIG. 1, in the present invention, the rotor magnets 82 are formed on the outer and inner cylinders and are spaced apart from each other by the interval 81, corresponding to 't'.

Through the above construction, the present invention improves the magnetic efficiency between the field magnets and the rotor magnets 82. When the rotor magnets 82 are continuously arranged as in the case of the prior art, the distance by which the lines of magnetic force with an adjacent rotor magnet 82 are formed is shortened, as shown in FIG. 8, so that reluctance R'' becomes smaller than that of the lines of magnetic force with the field cores, thus resulting in a phenomenon in which the lines of magnetic force are induced in the adjacent rotor magnet 82. In contrast, when a predetermined interval is left between neighboring rotor magnets 82, as shown in FIG. 7, the difference R-R' between the reluctances of the rotor magnets 82 and the field cores 92 is decreased, thus allowing more lines of magnetic force to be induced in the field cores.

The reluctance R (magnetic reluctance) is $R=L/\mu A$ (R: reluctance, L: distance, $\mu$: permeability, and A: area), so that the reluctance R has a close relationship with the permeability of air and the distance.

The present invention allows more lines of magnetic force of the rotor magnets 82 to be induced in the field cores 92 by increasing the reluctance with the adjacent rotor magnet 82, so that the number of lines of magnetic force between the rotor magnets 82 and the field cores 92 increases, thus improving rotation efficiency.

Meanwhile, in order to increase the number of lines of magnetic force, there is a method of increasing the magnetic flux density by increasing the magnetic force of a unitary rotor magnet 82 or the magnetic force of the field cores 92. However, since this method may entail several problems, such as an increase in the size of a motor, the present invention proposes a scheme for allowing a larger number of lines of magnetic force to be formed by increasing the number of times that the rotor magnets 82 meet the field cores 92, which is another aspect of the technical essence of the invention.

That is, unlike the prior art, as shown in FIG. 1, the present invention can provide an electric motor, including a rotor, in which rotor magnets 82 formed on the outer cylinder and the inner cylinder form ten pairs, and a stator 90, in which eight field magnets 900 are formed between the outer and inner cylinders of the rotor.

As shown in FIGS. 1 and 2, the rotor magnets 82 are configured such that one pair of rotor magnets, which are arranged on inner and outer cylinders to be opposite each other and are configured to have different polarities, is arranged to have different polarities with respect to neighboring rotor magnets.

According to the above electric motor, one field magnet 900 forms a connection to the lines of magnetic force ten times per revolution, so that, in the entire electric motor, eight field magnets 900 respectively attempt to connect to the lines of magnetic force ten times per revolution, thus consequently forming a total of 80 connections to the lines of magnetic force.

In this case, as shown in FIG. 3, a number of magnets corresponding to the number of pairs of rotor magnets are attached on the rotary magnet plate 42 for controlling the magnetization direction of the field magnets 900 so that polarity variation occurs ten times on one field core per revolution.

Preferably, as shown in FIG. 4, the present invention can also provide an electric motor, including a rotor 80, in which rotor magnets 82 arranged on an outer cylinder 80-1 and an inner cylinder 80-2 form 20 pairs, and a stator 90, in which 12 field magnets 900 are formed between the outer cylinder 80-1 and the inner cylinder 80-2 of the rotor 80. In this case, one field magnet 900 forms a connection to the lines of magnetic force twenty times per revolution, so that, in the entire electric motor, 12 field magnets 900 respectively attempt to connect to the lines of magnetic force twenty times per revolution, thus consequently forming a total of 240 connections to the lines of magnetic force.

When the rotor magnets 82 are arranged as 20 pairs of magnets, the polarities of the magnets are arranged, as shown in FIG. 5, and a rotary magnet plate 42, in which 20 magnets are arranged, as shown in FIG. 6, is used.

The present invention, constructed as described above, is compared to Korean patent No. 10-0417637, which indicates the conventional electric motor, as follows. The conventional electric motor is characterized in that it is composed of eight rotor magnet pairs (a total of 16 rotor magnets) and eight field magnets, and the ratio of the number of rotor magnets to the number of field magnets is 2:1 (two rotor magnets attract one field magnet). In contrast, the electric motor of the present invention of FIG. 1, composed of 10 rotor magnet pairs (a total of 20 magnets) and 8 field magnets, has a ratio of the number of rotor magnets to the number of field magnets of 2.5:1 (2.5 rotor magnets attract one field magnet), and the electric motor of the present invention of FIG. 3, composed of 20 rotor magnet pairs (a total of 40 magnets) and 12 field magnets, has a ratio of the number of rotor magnets to the number of field magnets of 3.3:1 (3.3 rotor magnets attract one field magnet). Accordingly, the intensity of the force between a unitary field core and the rotor magnets is further increased.

Through the above construction, the present invention can greatly improve the energy efficiency of the electric motor disclosed in Korean Patent No. 10-0417637.

Although the preferred embodiments of the present invention have been disclosed for illustrative purposes, it can be seen that the embodiments are only examples of implementations of the present invention, and various types of combinations are possible so as to realize the gist of the present invention, as shown in the drawings.

Therefore, it should be noted that the present invention is not limited to the above embodiments, and those skilled in the art will appreciate that various modifications, additions and substitutions are possible, without departing from the scope and spirit of the invention as disclosed in the accompanying claims.

What is claimed is:

1. An electric motor, comprising:
    a stator, in which field magnets are fixedly and radially installed on a circular panel-shaped base;
    a coaxial cylindrical rotor coupled to a shaft, which penetrates through a center of the base, and configured to allow the stator to be located at an inside thereof, the rotor being configured such that magnets, having different polarities to form each pair, are attached on an outer cylinder and an inner cylinder of the rotor and are arranged opposite each other;
    a cover coupled to the circular panel-shaped base to cover the rotor while causing the shaft of the rotor to penetrate through and protrude from the cover;
    a rotary magnet plate coupled to the shaft on a top of the cover, and provided with a number of magnets corresponding to a number of pairs of the rotor magnets;
    magnetic sensors formed on the top of the cover and configured to come into contact with the rotary magnet plate; and
    a current control device configured to control a magnetization direction of the field magnets of the stator using a rotation angle signal detected by the magnetic sensors,
    wherein the rotor magnets attached on the outer cylinder and the inner cylinder of the rotor have different polarities to form each pair and are arranged opposite each other, and respective pairs of rotor magnets are arranged on the outer and inner cylinders while being spaced apart from each other by a predetermined interval,
    the rotor is configured such that the rotor magnets arranged on the outer and inner cylinders form ten pairs, and
    the stator is configured such that eight field magnets are formed between the outer and inner cylinders of the rotor.

2. An electric motor, comprising:
    a stator, in which field magnets are fixedly and radially installed on a circular panel-shaped base;
    a coaxial cylindrical rotor coupled to a shaft, which penetrates through a center of the base, and configured to allow the stator to be located at an inside thereof, the rotor being configured such that magnets, having different polarities to form each pair, are attached on an outer cylinder and an inner cylinder of the rotor and are arranged opposite each other;
    a cover coupled to the circular panel-shaped base to cover the rotor while causing the shaft of the rotor to penetrate through and protrude from the cover;
    a rotary magnet plate coupled to the shaft on a top of the cover, and provided with a number of magnets corresponding to a number of pairs of the rotor magnets;
    magnetic sensors formed on the top of the cover and configured to come into contact with the rotary magnet plate; and
    a current control device configured to control a magnetization direction of the field magnets of the stator using a rotation angle signal detected by the magnetic sensors,
    wherein the rotor magnets attached on the outer cylinder and the inner cylinder of the rotor have different polarities to form each pair and are arranged opposite each other, and respective pairs of rotor magnets are arranged on the outer and inner cylinders while being spaced apart from each other by a predetermined interval,
    the rotor is configured such that the rotor magnets arranged on the outer and inner cylinders form 20 pairs, and
    the stator is configured such that 12 field magnets are formed between the outer and inner cylinders of the rotor.

\* \* \* \* \*